F. MÜLLER.
MACHINE FOR PRODUCING METALLIC BUSHINGS AND SIMILAR CYLINDRICAL BODIES.
APPLICATION FILED APR. 4, 1917. RENEWED AUG. 3, 1920.
1,360,242.
Patented Nov. 23, 1920.
5 SHEETS—SHEET 2.
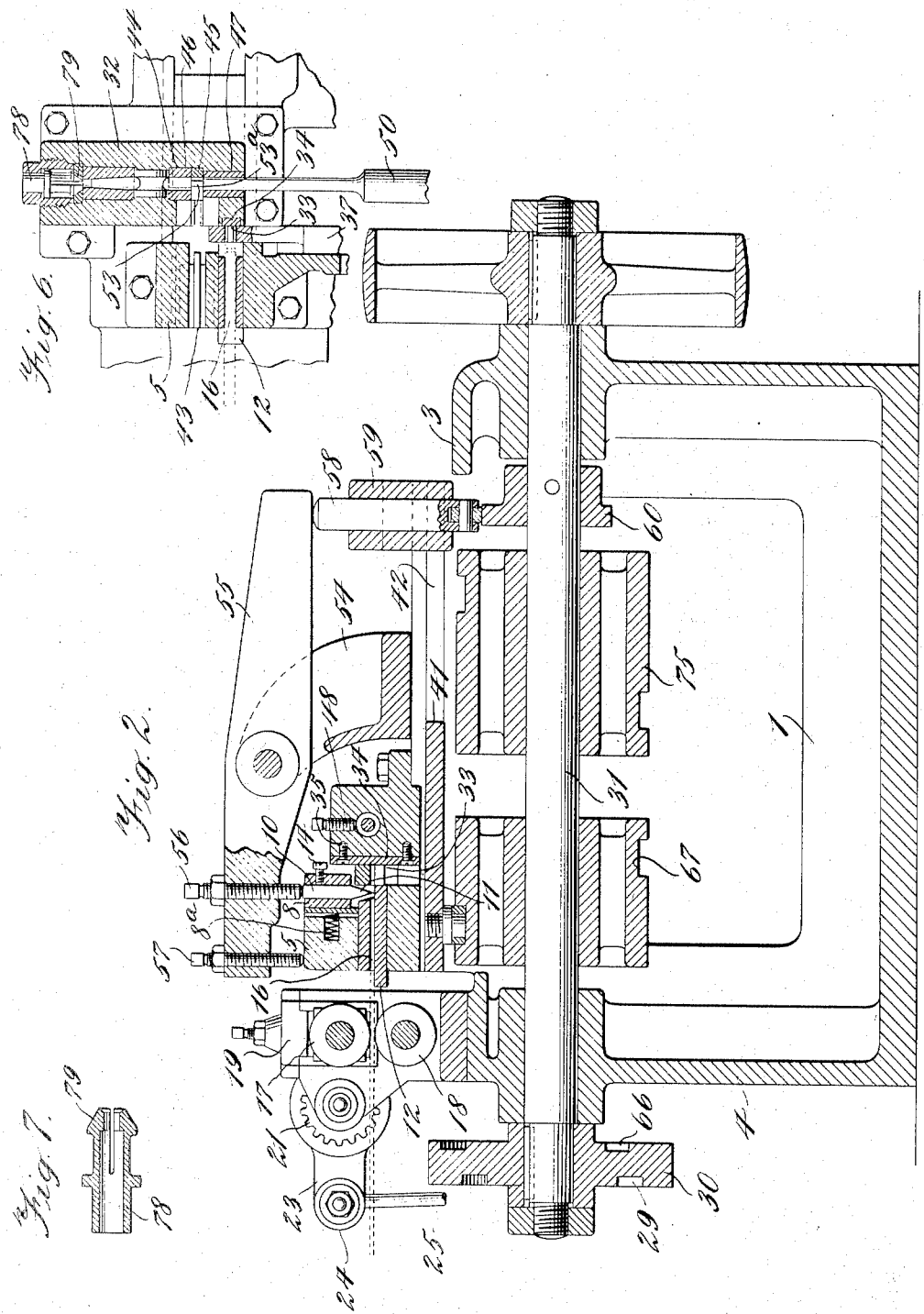
Witnesses:
Inventor
Friederich Müller
By his Attorneys

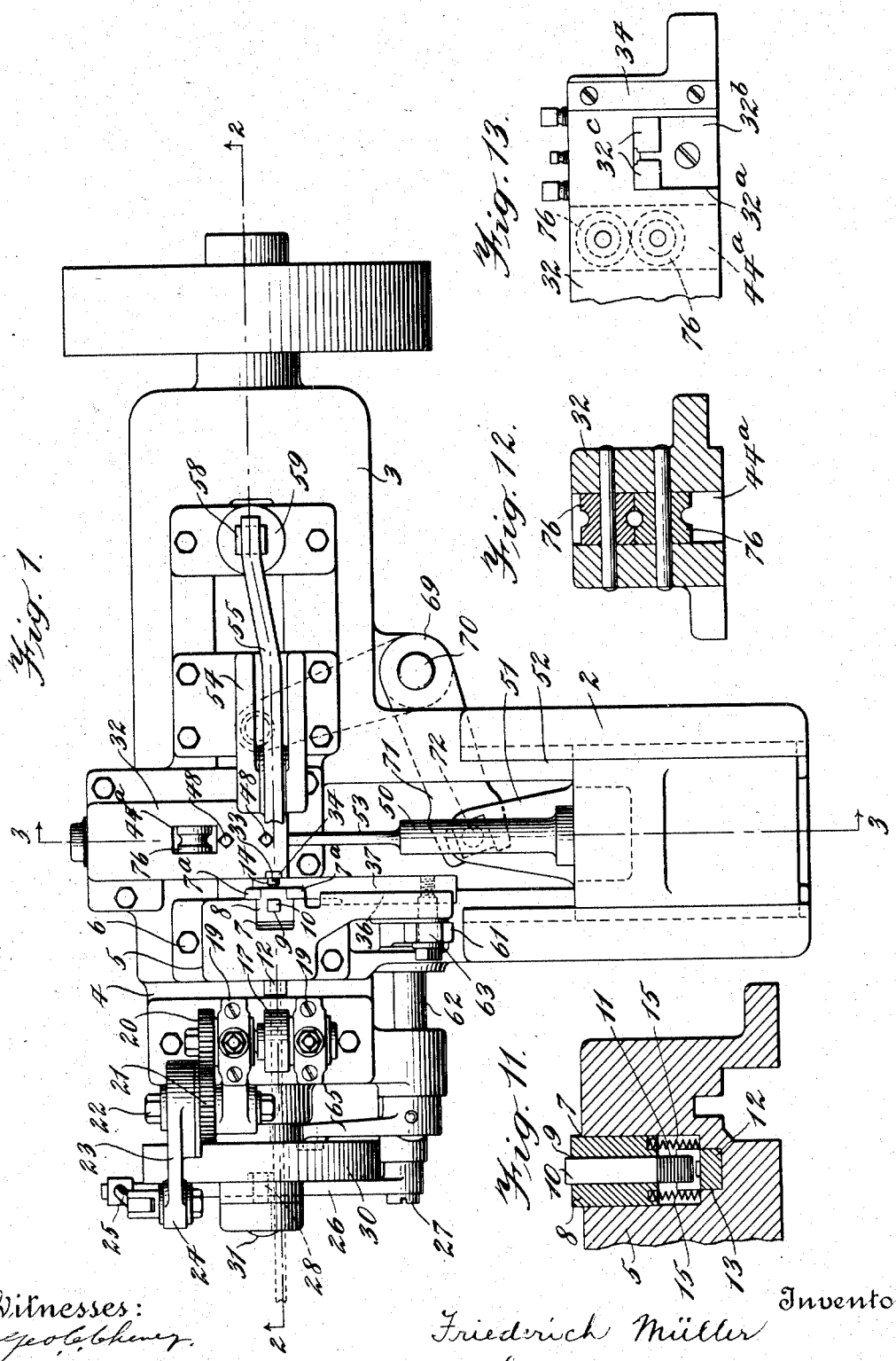

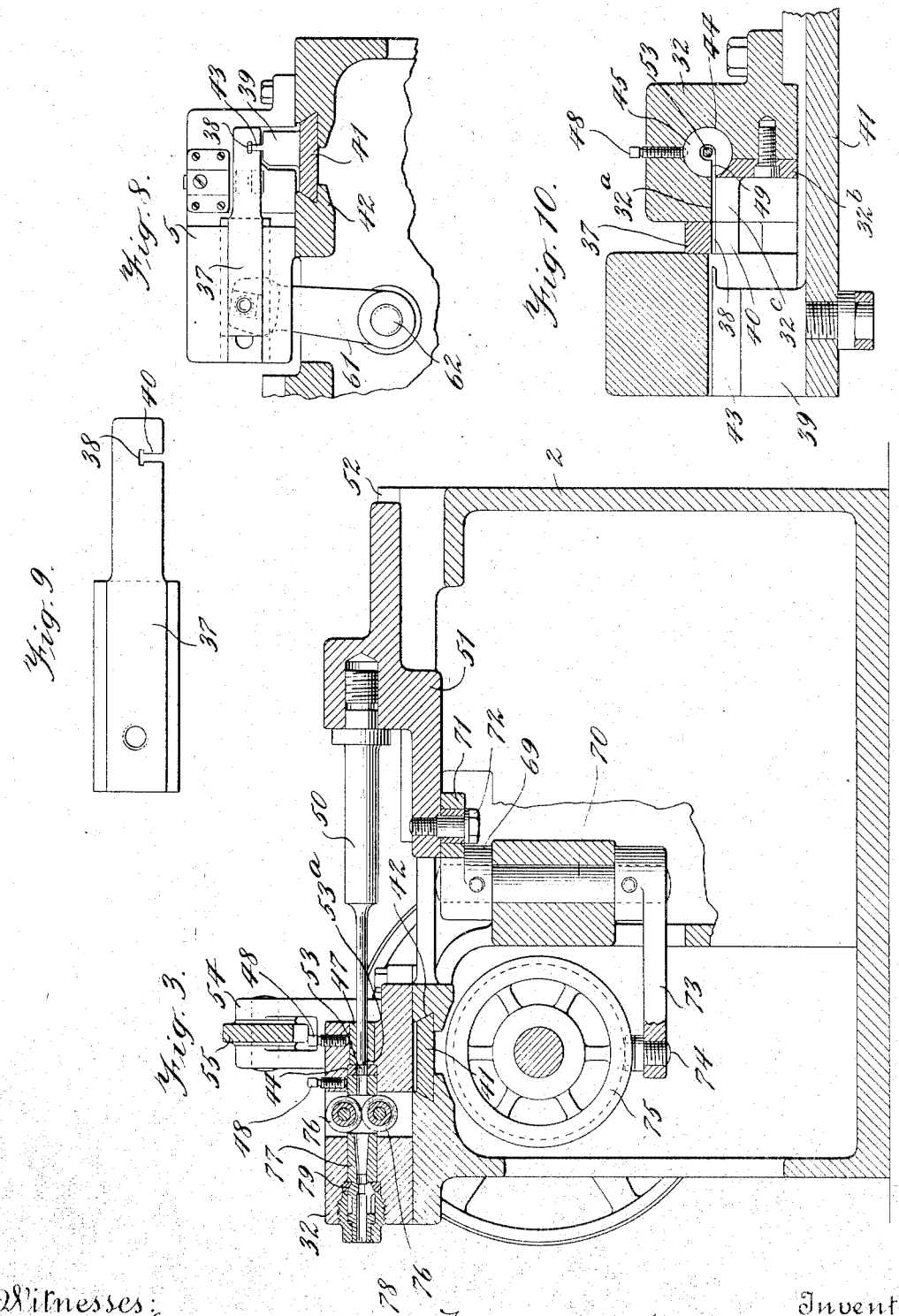

F. MÜLLER.
MACHINE FOR PRODUCING METALLIC BUSHINGS AND SIMILAR CYLINDRICAL BODIES.
APPLICATION FILED APR. 4, 1917. RENEWED AUG. 3, 1920.
1,360,242.
Patented Nov. 23, 1920.
5 SHEETS—SHEET 4.
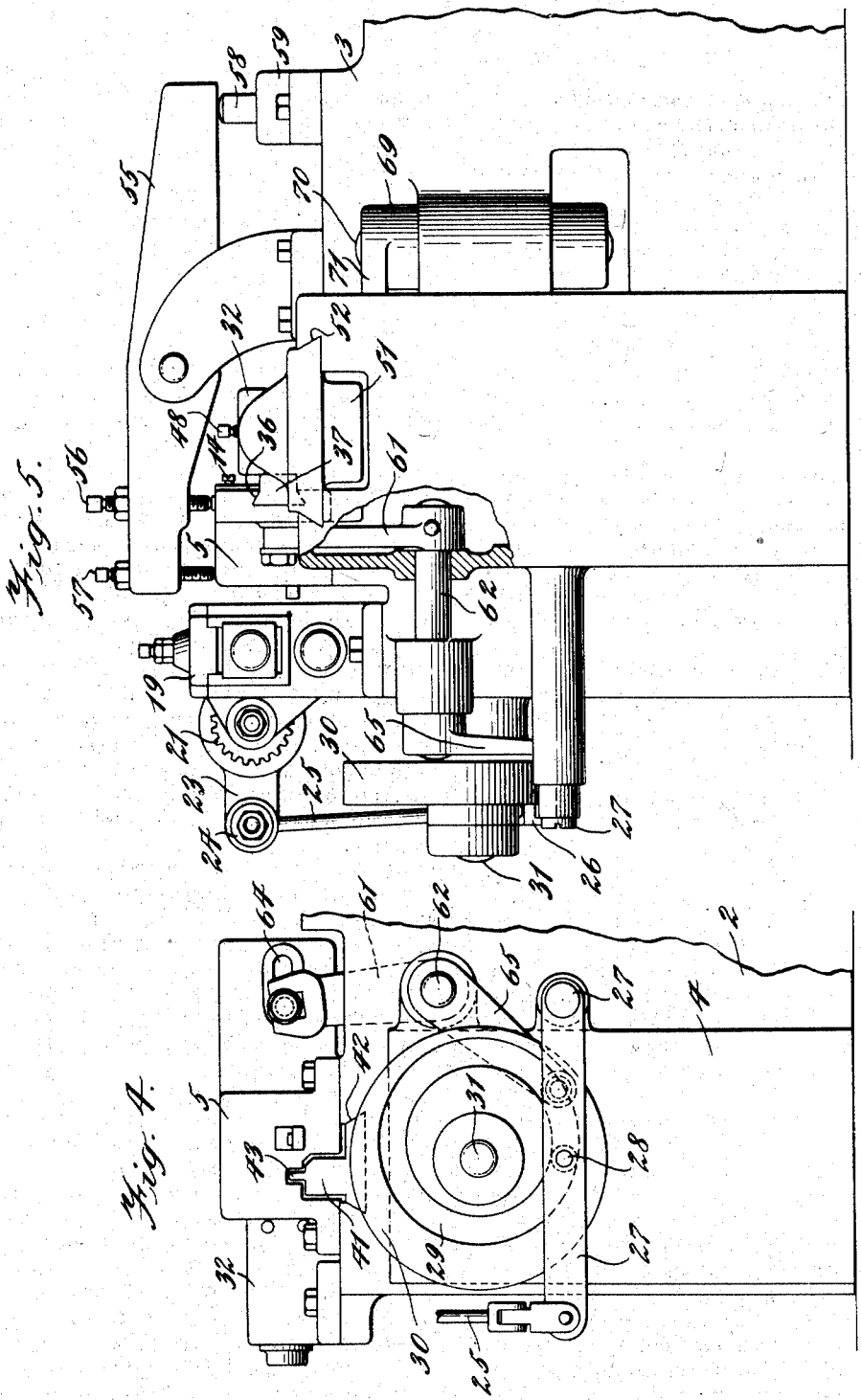

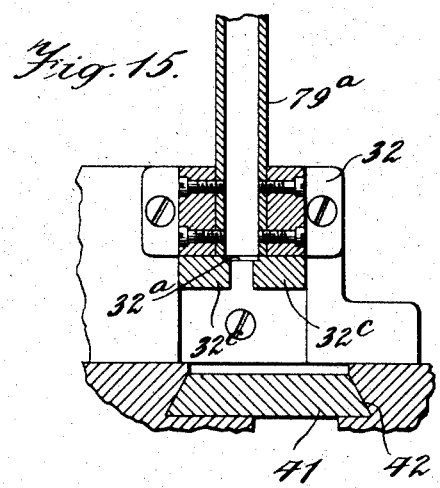
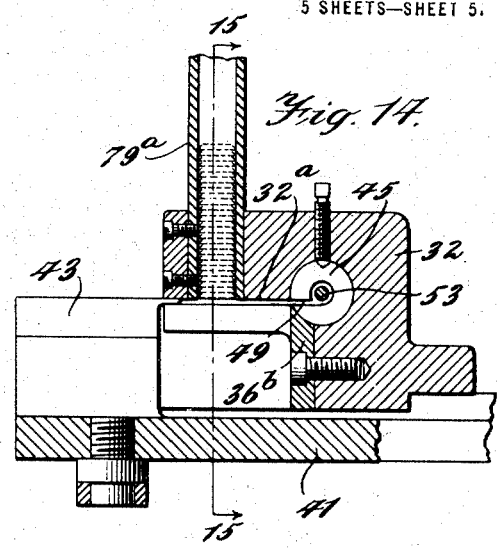
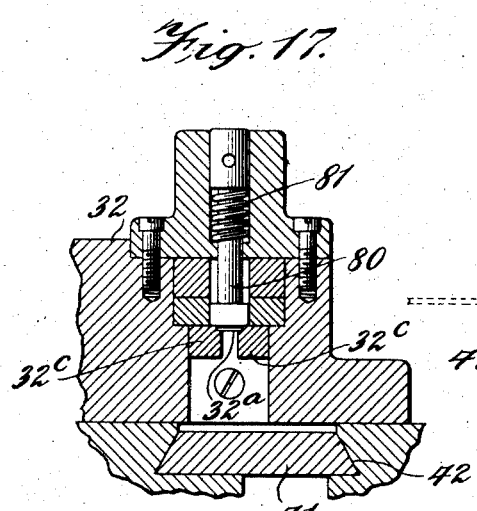
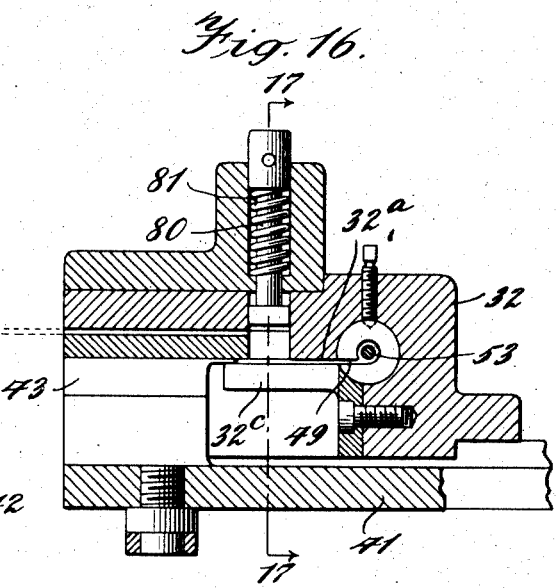
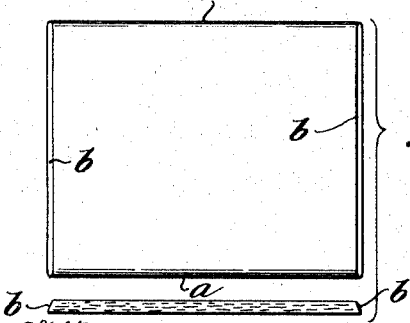

UNITED STATES PATENT OFFICE.

FRIEDERICH MÜLLER, OF HARTFORD, CONNECTICUT, ASSIGNOR TO THE WHITNEY MFG. CO., OF HARTFORD, CONNECTICUT, A CORPORATION OF CONNECTICUT.

MACHINE FOR PRODUCING METALLIC BUSHINGS AND SIMILAR CYLINDRICAL BODIES.

1,360,242.  Specification of Letters Patent.  Patented Nov. 23, 1920.

Original application filed December 31, 1914, Serial No. 879,912. Divided and this application filed April 4, 1917, Serial No. 159,814. Renewed August 3, 1920. Serial No. 401,082.

*To all whom it may concern:*

Be it known that I, FRIEDERICH MÜLLER, a citizen of the United States, residing at Hartford, in the county of Hartford and State of Connecticut, have invented certain new and useful Improvements in Machines for Producing Metallic Bushings and Similar Cylindrical Bodies, of which the following is a specification.

My invention relates broadly and generally to a new and useful machine for producing metallic bushings and similar cylindrical bodies.

An important object of the invention, among others, is to provide a machine which will produce a bushing which will be adapted for general use in the mechanical arts, but which will be particularly desirable for use in connection with power transmission chains, for instance, the well-known form of sprocket chains, and also of the link-belt type, which bushing may be made economically and rapidly from a blank of suitable metal, and which will have the advantages of being truly cylindrical both exteriorly and interiorly, which will have the grain of the metal extended circumferentially thereof, strengthening the same against fracture under strain, and which will be of such form as to facilitate the assembling of the same in the completed chain structure, particularly in connection with a machine for automatically applying said bushings to said chains, or the elements of the chains.

This application is a division of my application Serial No. 879,912, filed December 31, 1914.

The invention consists in the improvements to be more fully described hereinafter, and the novelty of which will be particularly pointed out and distinctly claimed.

I fully and clearly illustrate a machine embodying my invention in the accompanying drawings, to be taken as a part of this specification, and wherein—

Figure 1 is a top plan view of a preferred embodiment of the machine, certain parts being broken away to better disclose the operation and arrangement of certain parts thereof.

Fig. 2 is a vertical section on the line 2—2 of Fig. 1 looking in the direction of the arrows.

Fig. 3 is a section on the line 3—3 of Fig. 1.

Fig. 4 is a view in end elevation of a portion of the machine shown in Fig. 1, and illustrating mechanism for operating a transfer slide.

Fig. 5 is a view in rear elevation and partly in section, of a portion of the machine showing the arrangement of the transfer slide operated by the mechanism shown in Fig. 4, and also a slide for operating a mandrel.

Fig. 6 is a horizontal sectional view of a portion of the machine showing the location of a slide member for subjecting a blank to a curling or forming die, certain parts being removed and the transfer slide shown in position to receive the stock when it is fed through the guide block and cut-off.

Fig. 7 is an enlarged sectional detail view of a stripping device.

Fig. 8 is a front view of the transfer slide showing the same in the position it assumes after removing the blank from the cutting knife and presenting the same to the curling or forming die.

Fig. 9 is an enlarged detail view of the transfer slide.

Fig. 10 is an enlarged sectional view through the transfer slide and showing the curling or forming die, and a sectional view of the mandrel located in said curling or forming die.

Fig. 11 is an enlarged vertical section through the transfer slide block showing the cutting knife and its carrier, and the spring means for raising the same after the cutting operation.

Fig. 12 is an enlarged vertical sectional view through roller means for forming and sizing the bushings.

Fig. 13 is an enlarged view in side elevation of the sizing block and showing a stock plate to guide flat stock as it is being pushed into the curling or forming die.

Fig. 14 is a vertical sectional view of a modified form of the invention for feeding the stock in the form of previously cut blanks from the hopper to the curling or forming die.

Fig. 15 is a sectional view on the line 15—15 of Fig. 14.

Fig. 16 is a sectional view showing another means for cutting off the stock from a continuous strip and presenting it to the slide for moving it into the curling or forming die.

Fig. 17 is a section taken on the line 17—17 of Fig. 16 and showing the cutting-off plunger in lowermost position to serve as the guide for the stock as it is pushed into the curling or forming die.

Fig. 18 shows a plan and side elevation of the blank of metal from which the bushing is made, and previous to being curled.

Fig. 19 is a view in end elevation of the blank previous to being curled and showing the rounded edges thereof.

Fig. 20 shows the position assumed by the blank after being subjected to the action of the curling or forming die.

Fig. 21 shows the position assumed by the blank after being subjected to the forming rollers.

Fig. 22 is an end view of the completed bushing after it has been passed through the curling or forming die, the forming rollers and the sizing bushing or die.

Fig. 23 is a longitudinal section through the finished bushing.

In producing a bushing having the construction and attributes heretofore mentioned, the preferred embodiment of the invention herein disclosed operates on a strip of metal stock of the desired nature, and in which the fibers or grain extend lengthwise of the strip, and in which one or both, preferably both, side edges thereof are provided with rounded surfaces, as indicated at $a$ in Fig. 19 in the drawings, to cut a blank on a line extending transversely of the strip entirely across the same so as to produce a rectangular blank having two of its opposite parallel sides rounded, and the two other parallel sides cut at an incline to the plane of the blank as indicated at $b$. This blank is of such dimensions that its width from one rounded edge to the other will produce a bushing of corresponding length, and of such width from one inclined edge to the other that a bushing of the desired diameter and bore will be produced. This blank is then curled on an axis extending parallel to the inclined or transverse sides, which produces a tubular body substantially similar to the body shown in end elevation in Fig. 20 of the drawings. In this condition the inclined edges do not meet and a true cylinder is not produced. In performing this curling operation, the metal blank is preferably curled about a mandrel or core located within a cylindrical die member by forcing the blank with one of its inclined edges foremost into said die, and about the core by a movement at right angles to the longitudinal axis of the die and core, whereby the blank, by this engagement with the cylindrical surface of the die, is forced to curl or wrap about the core. A preferred form of this die and core will be described in detail hereinafter.

Upon completion of the curling operation, said body so curled, and while still on the mandrel, is subjected to a compression operation whereby the meeting inclined edges are forced into engagement with each other and a true cylindrical contour is given to both the bore and the circumference of said body. I accomplish this preferably by forcing said body, such as shown in Fig. 20, and while still on the mandrel, through a pair of compression die rollers which press and shape said body to substantially the form shown in Fig. 21, in which the bushing is substantially cylindrical, but the cut edges of the blank are slightly spaced apart and parallel to each other. The body in the form shown in Fig. 21, and while still on the core or mandrel, is then forced through a suitable compression die, which contracts the cylinder until it reaches the true cylindrical form shown in Fig. 22, in which the meeting edges abut. In this condition the bushing is completed and is in condition for use in any situation desired. It will be noted that in producing this bushing the inclined cut edges in the completed article abut so as to lie in a plane substantially radial to the longitudinal axis of the bushing. It will also be seen that in the completed article the fiber or grain of the metal extends about the bushing circumferentially which is of great advantage in that this arrangement of the fibers provides a tough and more rigid bushing, which is not liable to be splintered under blows or strain, this being due to the fact that the bushing is not brittle as the case would be where the grain of the metal runs longitudinally of the bushing. The action of the dies in compressing and forming the blank, results in the metal of the starting blank being drawn, stretched or flowed so that the finished product is of greater length than the width of the starting blank, and its circumference is greater than the length of the blank.

Referring to the drawings—

1 designates a machine frame, the construction of which may be varied widely without affecting the scope of my invention, but preferably consisting of two wings or sections 2, 3 arranged at right angles to each other, and a short wing or section 4 at right angles to the part 2 and extending in opposite directions from and in longitudinal alinement with the part 3. Mounted on the upper portion of the frame between the parts 3 and 4 is a fixed block 5, bolted to the bed plate of the frame as at 6, and provided with a vertical opening 7, in which is arranged for vertical reciprocation, a knife block or carrier 8, having a central vertical opening 9 in which is secured a chisel knife 10, the lower chisel end 11 of which depends from said block 8 and coöperates with an anvil plate 12 secured in a recess 13 in the bottom wall of the opening 7 in said block 5. The knife may be secured in the block 8 in any suitable manner, as by a set screw 14 threaded through said block and engaging said knife with its inner end. This knife has a double inclined chisel end, as indicated in Fig. 2 for a purpose to be presently set forth. The knife block or carrier 8 is normally urged upward by a pair of expansion springs 15, the ends of which respectively abut the bottom of the opening 7, on opposite sides of the plate 12, and the lower portion of said block or carrier 8. By this means the carrier is automatically raised to locate the cutting edge of the knife at a point above the plate 12. The knife carrier or block is held in place in the opening 7 by keeper plates 7ª, and is normally thrust laterally against said plates by means of a spring 8ª exerting its force expansively against the back wall of said opening 7, and the vertical face of the knife carrier 8, the sidewise movement being at right angles to the line of cut, as will be clear from Fig. 2. The particular function of this arrangement will be presently described. The plate or block 12 heretofore described is provided with a longitudinal passageway 16 leading to a point beneath the cutting edge of the knife, and opening through the opposite side of the block 5 from that on which the knife reciprocates, and adapted to guide a strip of stock to the knife so that the latter may sever the necessary portion to form a blank for a bushing. The strip of stock may be fed to the knife in any suitable manner, but I prefer to employ the means shown to the left of Figs. 1, 2, 4 and 5. In this form of feeding means I provide upper and lower feed rollers, 17, 18 having bearings in pedestals 19, mounted on the extension 4 of the machine frame. The upper of these rollers carries a gear 20 in mesh with a gear 21, mounted on a stub shaft 22 secured to one of the pedestals 19, said gear 21 having connected therewith a pawl and ratchet clutch mechanism 23, the operating lever 24 of which is reciprocated by a connecting rod 25 connecting said arm to a rock lever 26 fulcrumed on the frame as at 27, and having a cam follower pin 28 engaging an eccentric cam groove 29 on a rotatable cam disk 30 mounted on a horizontally disposed power shaft 31. The power shaft is mounted in suitable bearings on the frame and may be driven continuously in one direction by any suitable means. It will be apparent that the construction of the feeding means is such as to intermittently feed the strip of stock forward step by step to the knife.

Mounted on the frame, and in line with the part 2, and spaced from the block 5 and the knife 10 is a transversely arranged block, hereinafter referred to as a die block 32 having a vertical stop face 33 against which the inner end of the strip of stock abuts previous to being cut off by the knife, so that the strips cut will always be of a determined length, the length of blank cut corresponding to the distance from the knife edge to said face 33. This length may be regulated by providing said stop face with removable plates 34 of different thicknesses, adapted to be secured to the die block by bolts 35, whereby the said stop face can be located at different distances from the line of cut. It will also be understood that the feeding connections may be adjusted to regulate the amount of strip fed to the knife to correspond to the distance from the line of cut to said cut-off.

Arranged to reciprocate across the outer face of the knife 10, and between the block 5, and the block 32, is a reciprocable transfer slide 37 having a dovetail sliding connection 36 with a dovetail groove in the vertical face of the block 5. This transfer slide in retracted position extends by the knife and the opening 16, and is provided with a slot 38 to receive the end of the strip being severed, and transfer the same to a forming die to be presently described. This transfer slide in its retracted position, is arranged with said slot in line with the line of feed of the strip of stock, so as to receive that end portion of the strip which is to be severed and which abuts the face plate 34. The transfer slide is timed to transfer the severed portion of the strip, which is to be formed into the bushing, to a point to one side of the knife and so as to bring its slot 38 in line with a forming or curling slide 39 which reciprocates at right angles to the path of movement of the transfer slide 37 and moves the metal blank to the curling or forming die. The transfer slide is also formed with a vertical slot 40 opening through the bottom edge of the slide into said slot 38, for a purpose to be presently set forth. The curling or forming slide consists of a bed portion 41 sliding in guideways 42 in the main frame from which rises a vertical blade member 43, the upper edge portion of which is adapted to reciprocate through the vertical slot 40 formed in the transfer slide and to project up far enough to engage the metal blank in the slot 38 to dislodge said blank from said transfer slide, substantially as shown in Figs. 6, 8 and 10 of the drawings.

I will now describe the curling or forming die into which the metal blank, shown in Figs. 18 and 19, is forced by the curling or forming slide 39, to be curled to the form shown in Fig. 20 of the drawings. For this purpose the die block 32 is formed with a horizontal cylindrical bore 44 extending at right angles to the line of reciprocation of the curling or forming slide, and at an intermediate point of this bore is located a cylindrical die bushing 45 held by guide bushings 46, 47, arranged in said cylindrical bore on opposite sides of the cylindrical die, the bushings 46, 47, being held in position by set screws 48 threaded through the upper portion of said block 32. This cylindrical die bushing 45 is open at one edge through a slot 49 substantially tangential to the circumference of the internal cylindrical wall of the die, as clearly shown in Fig. 10 of the drawings. The arrangement of the die and curling slide is such that when the metal blank is dislodged from the transfer slide and pushed forward by the curling slide, said blank will be pushed through the slot or opening 49 by the curling slide and curled up against the inner cylindrical surface of the curling die, the blade 43 of the curling slide entering the said slot 49, so that the entire metal blank is passed into the cylindrical bore of the curling die 45. The die block 32 may be recessed adjacent the entrance to the die, as 32ª, to receive a guide member 32ᵇ bolted to the die block and having horizontal parallel spaced arms 32ᶜ upon which the blank slides from the transfer slide to the die when moved by the curling slide blade 43, said blade 43 moving between said arms.

Arranged to slide in the said bore 44 through the die block 32, is a combined pusher and mandrel or core 50 carried by a reciprocating bed 51, sliding in guideways 52, on the frame part 3, said mandrel or core being adapted to reciprocate through the sleeve 47 heretofore described, closely fitting the bore of the same, and having at its end a reduced cylindrical core part 53 which, when the mandrel is in one position is located centrally of the cylindrical curling die 45, so that said core part 53 forms a mandrel or core about which the metal blank is curled in the space between the part 53 and the inner wall of the curling die 45 when said blank is formed into the die 45 by the curling slide 39. At the base of the core part 53 is a shoulder 53ª, which serves a purpose to be presently described.

It will be understood that the feeding mechanism, the knife, the transfer slide, curling slide, and the mandrel are so timed in their movements that the strip will be presented to the knife; then severed by the knife, whereupon the severed blank will be moved by the transfer slide into the path of movement of the curling slide, and the curling slide will then force it into the curling die 45 around the core portion 53 of the mandrel, the mandrel-moving means having a dwell for a period sufficient to hold the core-piece 53 in the die 45 during the curling of the blank, and the transfer slide having a dwell long enough for the curling slide to pass through the same in forcing the blank to the die and then return to initial position. Any suitable means may be provided for producing the sequence of movements just set forth, which means may be varied without departing from the spirit and scope of my invention.

I will now proceed to describe one way of operating the knife to cut the strip. Mounted on the part 3 of the frame is a standard comprising vertical spaced arms 54 upon which is fulcrumed a rock lever 55 adapted to engage the upper portion of the chisel knife to move the same downward to engage the strip to cut off a bushing blank. I preferably provide an adjustable engagement between one end of said lever and the knife, the same comprising a thrust bolt 56 threaded through the lever and adapted to engage with its lower end upon the upper end of the knife, so that when the said lever is rocked in one direction, the knife will be moved down to sever the strip, and when the lever is moved in the opposite direction, the springs 15 will act on the carrier block to raise the knife. The forward end of the lever is also provided with a stop screw 57 threaded therethrough and adapted to engage the upper surface of the block 5 to limit downward movement of the lever so that the knife in its downward movement will just meet the block 12, and not cut into the same or be dulled thereby. The lever may be timed by any suitable means so as to descend subsequent to the feeding of the strip, and for this purpose a reciprocating plunger 58, sliding in a vertical guide 59 on the main frame and operated by an eccentric cam 60 on the shaft 31, may be employed.

The transfer slide 37, may be reciprocated by a lever 61 carried by a horizontal rock shaft 62, and having its free end in engagement with a pin 63, connected to the said slide and projecting laterally therefrom through a slot 64 in the block 5. The shaft 62 is rocked by an arm 65 connected thereto and engaging a cam groove 66 in the cam disk 30, heretofore described.

The curling slide may be operated by a grooved cam 67 mounted on the shaft 31, and engaging a pin 68 carried by the base piece of said curling slide, and the mandrel may be operated by a bell-crank lever 69, fulcrumed on the frame as at 70, and having one of its arms 71 pivotally engaging the mandrel carrier or bed 51, as at 72, and its other arm 73 provided with a pin 74 engaging a grooved cam 75 also mounted upon the shaft 31 to rotate therewith. So far the time relation of the parts described, is as follows: The feeding mechanism feeds the strip forward a distance sufficient to supply one bushing blank, whereupon the knife 10 descends, severing the blank from the strip, then the transfer slide 37 moves the severed blank away from the knife into the path of movement of the curling slide 43, and the latter then moves forward to engage the blank and force the same into the curling die 45, and around the core-piece 53 of the mandrel 50.

The lateral sliding movement of the knife carrier, in the form shown in Fig. 2, is provided so that when the knife descends it may have sufficient lateral play to produce the inclined edge on the rear of the blank cut-off, and also on the forward edge of the strip of stock. The lateral movement also permits the carrier and knife to move back from the cut blank so as not to jam or bend the same against the stop face on the block 32, due to the chisel knife forcing the strip of stock and the cut blank away from each other.

These parts then return to their natural positions for the cutting and transfer of the metal blank, during which period the mandrel 50, with the core-piece 53, moves forward with the curled metal blank and forming the latter through a pair of upper and lower compressing and forming die rollers 76, arranged in the bore 44 whereby the metal blank in the form shown in Fig. 20 is reduced to the form shown in Fig. 21, and the mandrel 50 continues its movement carrying the blank in the form shown in Fig. 21 into a tapered die bushing 77 in longitudinal alinement with the die 45, whereby the bushing blank is compressed and shaped to the form shown in Fig. 22, which is the completed commercial article. In the forward movement of the mandrel, the shoulder 53ª engages one end of the bushing curled on the core-part 53, so that the proper thrust is given the bushing to carry it through the rollers 76 and the die 77. After being subjected to the action of the tapered die bushing 77, the bushing is carried on still further by the mandrel until it reaches a stripping chuck 78 having spring hook arms 79, which catch over the rear end of the completed bushing and hold the latter so that when the mandrel 50 is retracted to its initial position, as shown in Figs. 1, 3 and 6, the completed bushing is stripped from the core portion 53 of the mandrel. As soon as the mandrel is returned to its intial position, the feeding mechanism, knife, a transfer slide and curling slide, repeat the operation heretofore described to again curl the blank about the core portion of the mandrel, and the latter then forces the curled blank successively through the compressing or forming rollers, and the tapered die to the stripping chuck.

In the forms of the invention shown in Figs. 14 and 15, the cutting mechanism and the transfer slide, and its operating mechanism may be omitted, because the blanks from which the bushings are to be made, are previously cut by other means. In this form of the invention I provide a hopper arranged over the pair of separated supports or arms 32ᶜ spaced from the bottom of said hopper substantially the thickness of the blank, and adapted to support a stack 79ª of previously cut blanks arranged one above the other in the hopper, and adapted to gravitate one by one onto said support in the path of movement of the curling slide. In this arrangement, the curling slide 39 reciprocates between the spaced supporting members or arms 32ᶜ, and removes one blank at a time from the bottom of the stack in the hopper and forces the blank into the curling die for the purpose heretofore described.

In Figs. 16 and 17, as shown, a further embodiment of the invention in which the transfer slide is dispensed with, and the cutting member transfers the cut blank from a strip into position to be engaged by the curling slide to be presented to the curling die. In this form, a cutting plunger 80 is arranged in the block 32 to reciprocate by, and shear against, the vertical squared end of that portion of the block 5 through which the strip of stock is fed, said cutting block being urged to retracted position by a spring 81 and moved to shear the metal by the same means shown in Figs. 1, 2, 3 and 5. In its downward movement, the cutting blank moves the cut metal blank down into the upper surface of spaced guide members 32ᶜ, from which point it is moved by the curling slide into the curling die in the same manner as heretofore described. The machine above described is adapted for manufacturing bushings of various sizes within limits, by merely interchanging the die bushings so as to provide one of the diameter to produce a bushing of the desired size, and by the interchange of mandrels with core-pieces corresponding to the bore of the bushing.

It will be understood that, in small bushings wherein the metal stock is necessarily thin, it will not be obligatory to provide the inclined edges on the blank before curling. In this case the shearing means shown in Figs. 16 and 17 may be employed.

What I claim and desire to secure by Letters Patent of the United States is—

1. In combination, a die having a cylindrical bore and a longitudinally extending slot opening into the bore through the side wall thereof through which a metal blank may be fed to said bore, a core in said bore, means for forcing a blank into said bore and around the core, said core having a shoulder, said die having also an end opening, and means for moving said core to carry a blank curled thereon through said end opening.

2. In combination, a die having a cylindrical bore and a longitudinally extending slot opening into the bore through the side wall thereof through which a metal blank may be fed to said bore, and tangential to said bore, a core in said bore, said die having an end opening, means to move the core to carry a blank thereon from the interior of said die through the end opening and a forming slide having a blade member for forcing the blanks through said slot into said die.

3. In a machine of the character described, a die having a cylindrical bore, and having an opening into the bore through the side wall thereof through which a metal blank may be fed to said bore, a core in said bore, means for forcing a blank through said opening into said bore and around said core, and means for moving the core and blank longitudinally through said bore.

4. In a machine of the character described, a die having a cylindrical bore open at both ends, and having an opening into the bore through the side wall thereof through which a metal blank may be fed to said bore, a core longitudinally movable in said bore, means for forcing a blank of metal through said opening into said bore and around the core, a forming die in line with said bore, and means to move said core longitudinally to carry the blank from the first-named die to the forming die.

5. In a machine of the character described, a die having a cylindrical bore open at both ends, and having an opening into the bore through the side wall thereof through which a metal blank may be fed to said bore, a core longitudinally movable in said bore, means for forcing a blank of metal through said opening into said bore and around the core, and forming die rollers in line with said bore, and means to move said core through said bore to carry the blank from the first-named die to the forming die.

6. In a machine of the character described, a die having a cylindrical bore open at both ends, and having an opening into the bore through the side wall thereof through which a metal blank may be fed to said bore, a core longitudinally movable in said bore, means for forcing a blank of metal through said opening into said bore and around the core, forming rollers and a tapered compression die in line with said bore, and means to move said core longitudinally to carry the blank from said first-named die to and through said rollers and tapered die.

7. In a machine of the character described, a die having a cylindrical bore, and having an opening into the bore through the side wall thereof through which a metal blank may be fed to said bore, a core longitudinally movable in said bore, and means for forcing a blank through said opening into said bore and around said core, means for moving said core to carry the blank from said die, and means for stripping said blank from said core.

8. In a machine of the character described, a die having a cylindrical bore, and having an opening into the bore through the side wall thereof through which a metal blank may be fed to said bore, a core longitudinally movable in said bore, means for forcing a blank through said opening into said bore and around said core, means for moving said core lengthwise to carry the blank out of said bore, and means for stripping said bushing from said core, said stripping means consisting of an expansible and contractible chuck arranged in line with said bore.

9. In a machine of the character described, cutting mechanism, strip feeding mechanism, a curling die having a cylindrical bore and a longitudinal slot opening into said bore through which a metal blank may be fed to said bore, a transfer slide to move the cut blanks from said cutting mechanism and present the same in line with said longitudinal slot of the curling die, and a curling slide to force the blanks one at a time through said slot into the curling die.

10. In a machine of the character described, cutting mechanism, strip feeding mechanism, a curling die having a cylindrical bore and a longitudinal slot opening into said bore through which a metal blank may be fed to said bore, a transfer slide to move the cut blanks from said cutting mechanism and present the same in line with said longitudinal slot of the curling die, a curling slide to force the blanks one at a time through said slot into the curling die, a core in the curling die, a compression die, and means for moving the core longitudinally of said bore to carry the curled blank from the curling die to said compression die.

11. In a machine of the character described, blank feeding mechanism, a curling die having a cylindrical bore and a longitudinal slot through the wall through which a metal blank may be fed to said bore, a reciprocating core-piece in the bore of said die, die rollers, a compression die in line with the bore of said curling die, and means to reciprocate said core-piece through said dies and rollers.

12. In a machine of the character described, blank feeding mechanism, a curling die having a cylindrical bore open at both ends and also having a slot in the wall through which a metal blank may be fed to said bore, a reciprocating core-piece in the bore of said die, die rollers, a compression die in line with the bore of said curling die, means to reciprocate said core-piece through said dies and rollers, and means to strip the said core-piece.

13. In a machine of the character described, blank feeding mechanism, a curling die having a cylindrical bore open at both ends and also having a slot in the wall through which a metal blank may be fed to said bore, a reciprocating core-piece in the bore of said die, die rollers, a compression die and a stripping device successively in line with the bore of said curling die, and means to reciprocate said core-piece through said dies and rollers and in operative relation to the stripping device.

14. In combination, a die member formed of a single piece of metal and having a cylindrical bore and also having a longitudinal slot formed in the wall thereof through which a metal blank may be fed to said bore, a core within said bore, means for forcing a blank within said bore around the core, and means associated with said core for removing the formed blank from said bore.

15. In combination, a stationary die member formed of a single piece of metal and having a cylindrical bore and also having a longitudinal slot formed in the wall thereof through which a metal blank may be fed to said bore, a core within said bore, means for forcing a blank within said bore around the core, and means associated with said core for removing the formed blank from said bore.

In testimony whereof I have hereunto signed my name in the presence of two subscribing witnesses.

FRIEDERICH MÜLLER.

Witnesses:
  E. M. LOCKWOOD,
  C. G. HEYLMURE.